United States Patent
Geens et al.

(10) Patent No.: US 11,105,987 B2
(45) Date of Patent: Aug. 31, 2021

(54) FIBER MANAGEMENT TRAY WITH ENHANCED ACCESSIBILITY

(71) Applicant: CommScope Connectivity Belgium BVBA, Kessel-Lo (BE)

(72) Inventors: Johan Geens, Bunsbeek (BE); Kristof Vastmans, Kessel-Lo (BE); Eric Marcel M. Keustermans, Houwaart (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/626,139

(22) PCT Filed: Jun. 23, 2018

(86) PCT No.: PCT/EP2018/066841
§ 371 (c)(1),
(2) Date: Dec. 23, 2019

(87) PCT Pub. No.: WO2018/234578
PCT Pub. Date: Dec. 27, 2018

(65) Prior Publication Data
US 2020/0124803 A1      Apr. 23, 2020

Related U.S. Application Data

(60) Provisional application No. 62/524,258, filed on Jun. 23, 2017.

(51) Int. Cl.
*G02B 6/00* (2006.01)
*G02B 6/38* (2006.01)
*G02B 6/44* (2006.01)

(52) U.S. Cl.
CPC ......... *G02B 6/3897* (2013.01); *G02B 6/4455* (2013.01)

(58) Field of Classification Search
CPC ... G02B 6/3897; G02B 6/4455; G02B 6/4453
See application file for complete search history.

(56) References Cited

U.S. PATENT DOCUMENTS

| 5,167,001 A | 11/1992 | Debortoli et al. |
| 9,575,263 B2 | 2/2017 | Gurreri et al. |
| (Continued) | | |

FOREIGN PATENT DOCUMENTS

| EP | 1 852 722 A2 | 11/2007 |
| WO | 02/21182 A1 | 3/2002 |
| WO | 2010/105651 A1 | 9/2010 |

OTHER PUBLICATIONS

Machine translation of EP 1852722 A2, Rodolphe et al., Nov. 7, 2007, 19 pages.*

(Continued)

*Primary Examiner* — Jennifer Doan
(74) *Attorney, Agent, or Firm* — Merchant & Gould P.C.

(57) ABSTRACT

Aspects and techniques of the present disclosure relate to a telecommunications optical fiber management tray (100) that provides enhanced access to connectors and adapters. In one example, a fiber optic telecommunications tray (100) is disclosed which has movable components that can configure the tray between a storage position and an access position. In the storage position, one or more fiber optic connectors (154) and a fiber containment wall (106) extending from a base (104) of the tray (100) are positioned such that a port of a connector mounted (154) to the tray (100) has a longitudinal axis that passes through the fiber containment wall (106). In the access position, the one or more fiber optic connectors (154) and the fiber containment wall (106) are position such that the connector port longitudinal axis does not pass through the fiber containment wall (106). In the access position, adapters can be inserted or removed from (Continued)

the tray-mounted connectors without a line-of-sight obstruction from the fiber containment wall.

17 Claims, 14 Drawing Sheets

(56) References Cited

U.S. PATENT DOCUMENTS

| | | | |
|---|---|---|---|
| 2004/0062508 A1* | 4/2004 | Blankenship | G02B 6/445 385/134 |
| 2009/0097813 A1* | 4/2009 | Hill | G02B 6/4454 385/135 |
| 2014/0321825 A1 | 10/2014 | Claessens et al. | |
| 2016/0349472 A1* | 12/2016 | Clatanoff | G02B 6/444 |

OTHER PUBLICATIONS

International Search Report and Written Opinion of the International Searching Authority for International Patent Application No. PCT/EP2018/066841 dated Sep. 28, 2018, 14 pages.

\* cited by examiner

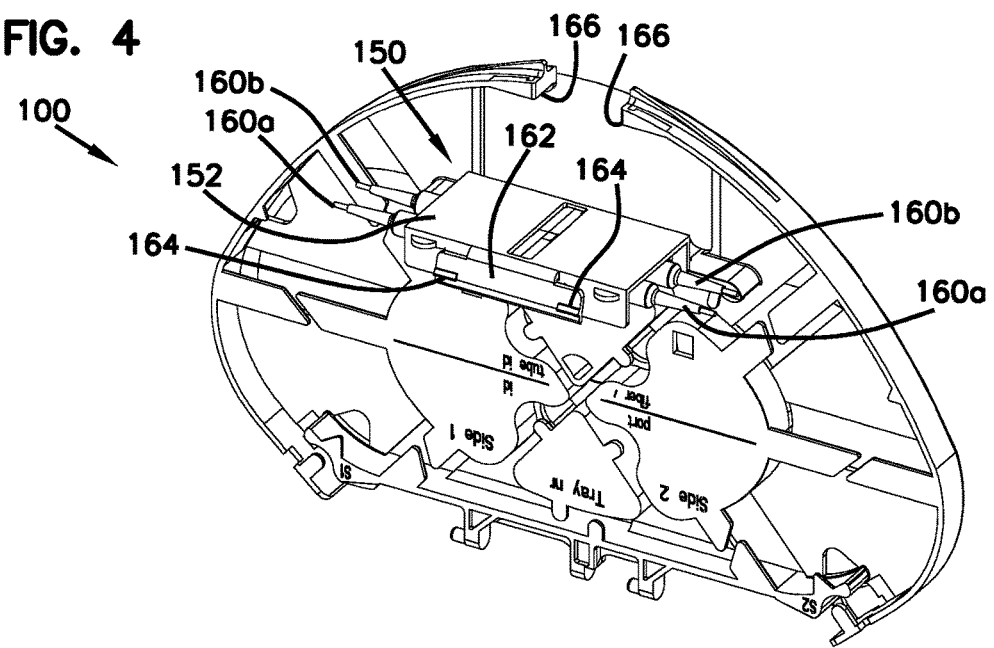
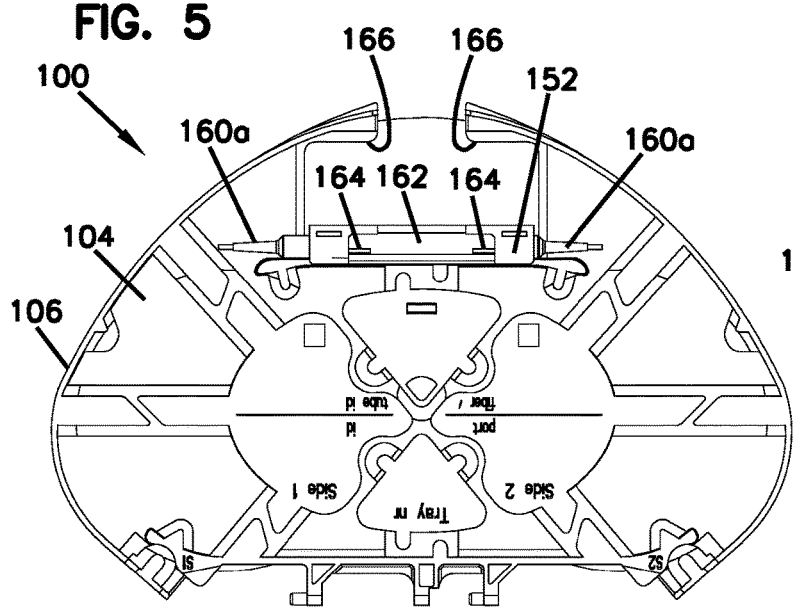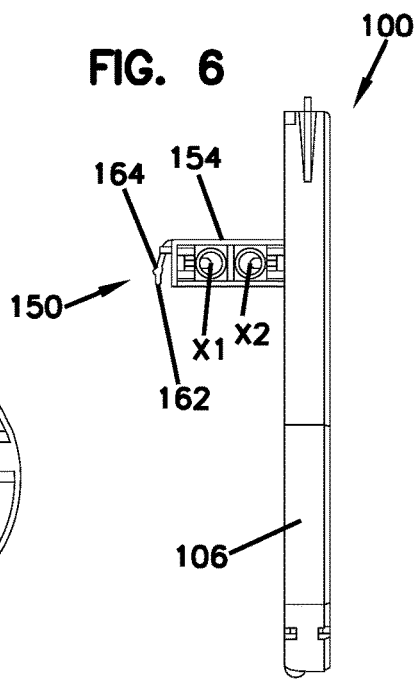

FIBER MANAGEMENT TRAY WITH ENHANCED ACCESSIBILITY

CROSS-REFERENCE TO RELATED APPLICATION

This application is a National Stage Application of PCT/EP2018/066841, filed on Jun. 23, 2018, which claims the benefit of U.S. Patent Application Ser. No. 62/524,258, filed on Jun. 23, 2017, the disclosures of which incorporated herein by reference in their entireties. To the extent appropriate, a claim of priority is made to each of the above disclosed applications.

TECHNICAL FIELD

The present disclosure relates generally to telecommunications management devices. More particularly, the present disclosure relates to fiber management trays for managing optical fibers.

BACKGROUND

Optical fiber distribution systems may include equipment such as fiber management trays that are mounted in telecommunications closures or at other locations. Fiber management trays are commonly used to manage, store and protect optical fibers and optical splices. Fiber management trays include fiber routing paths for allowing excess length of optical fiber to be stored in looped configurations without violating minimum bend radius requirements for the optical fiber. Fiber management trays typically include fiber guide structures that define the fiber routing paths and splice storage locations. Fiber optic components such as fiber optic fusion splice holders, passive optical splitters and wavelength division multiplexers are often mounted to fiber management trays. Improvements in fiber management trays are needed for optical fiber accessibility and handling.

SUMMARY

In one aspect of the disclosure, a fiber optic telecommunications tray is presented that includes a main body including a base and a fiber containment wall extending upwardly from the main body. The fiber containment wall defines portions of a perimeter of the main body of the tray that surrounds the base. The fiber containment wall and base define a storage region extending from the base to a distal end of the fiber containment wall. The tray also includes a frame structure holding one or more fiber optic connectors, and is mounted to the main body. The one or more fiber optic connectors each have a port for receiving a fiber optic adapter that is aligned along a longitudinal axis. The tray is configurable from a storage position to an access position. In the storage position, the one or more fiber optic connectors and the fiber containment wall are positioned such that the connector port longitudinal axis passes through the fiber containment wall. In the access position, the one or more fiber optic connectors and the fiber containment wall are positioned such that the connector port longitudinal axis does not pass through the fiber containment wall.

In one example, the storage position includes the frame structure being rotated with respect to the base such that the connector port longitudinal axis passes through the fiber containment wall. In one example, the access position includes the frame structure being rotated with respect to the base such that the connector port longitudinal axis does not pass through the fiber containment wall.

In one example, the storage position includes a first part of the main body being positioned with respect to a second part of the main body such that the connector port longitudinal axis passes through the fiber containment wall and the access position includes the first part of the main body being positioned with respect to the second part of the main body such that the connector port longitudinal axis does not pass through the fiber containment wall. In one example, the first part of the main body includes independently movable first and second subparts. In one example, the first and second subparts include portions of the base and portions of the fiber containment wall. In one example, the tray includes a first hinge portion about which the first subpart can rotate with respect to the main body first part and includes a second hinge portion about which the second subpart can rotate with respect to the main body first part. In one example, the first and second hinge portions are formed in the fiber containment wall. In one example, the first and second hinge portions are formed in the base.

In one example, a fiber optic telecommunications tray is disclosed that has a main body including a base and a fiber containment wall extending upwardly from the main body, the fiber containment wall defining portions of a perimeter of the main body of the tray that surrounds the base, the fiber containment wall and base defining a storage region extending from the base to a distal end of the fiber containment wall; and includes a frame structure holding one or more fiber optic couplers, the frame structure being pivotally mounted to the main body, the one or more fiber optic couplers each having oppositely facing ports for receiving a fiber optic adapter, the oppositely facing ports being aligned along a longitudinal axis. In one aspect, the tray is configurable from a storage position to an access position, wherein in the storage position, a first part of the main body being positioned with respect to a second part of the main body such that the connector port longitudinal axis passes through the fiber containment wall, and wherein, in the access position, the first part of the main body being positioned with respect to the second part of the main body such that the connector port longitudinal axis does not pass through the fiber containment wall. In one example, the main body includes independently movable first and second subparts. In one example, the first and second subparts include portions of the base and portions of the fiber containment wall. In one example, the tray includes a first hinge portion about which the first subpart can rotate with respect to the main body first part and includes a second hinge portion about which the second subpart can rotate with respect to the main body first part.

In some examples, the one or more fiber optic connectors includes one SC-type or LC-type connectors.

In some examples, the one or more fiber optic connectors includes a duplex coupler.

In some examples, the main body includes a hinge member for pivotally mounting the tray to a structure. In some examples, the hinge member is a living hinge.

In some examples, the tray includes fiber management features defining a cable routing pathway.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 4 is a front perspective view of the example telecommunications optical fiber management tray shown in FIG. 1, wherein the tray is placed in an access position;

FIG. 5 is a front view of the example telecommunications optical fiber management tray shown in FIG. 4;

FIG. 6 is a side view of the example telecommunications optical fiber management tray shown in FIG. 4;

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 7:
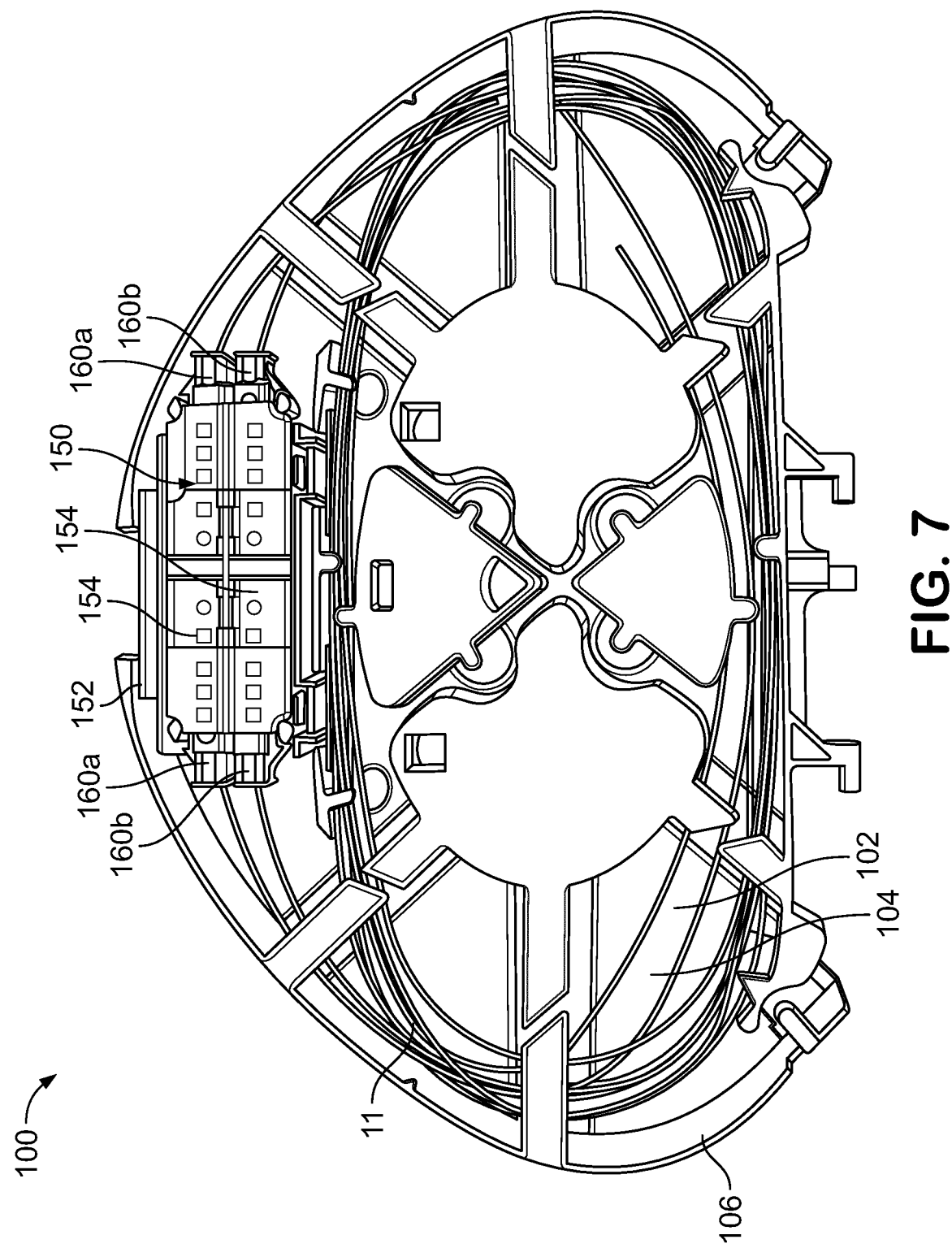
FIG. 7 is a front view of the example telecommunications optical fiber management tray shown in FIG. 1, wherein the tray is in the storage position and a plurality of optical fibers are stored within the tray.
Figure 8:
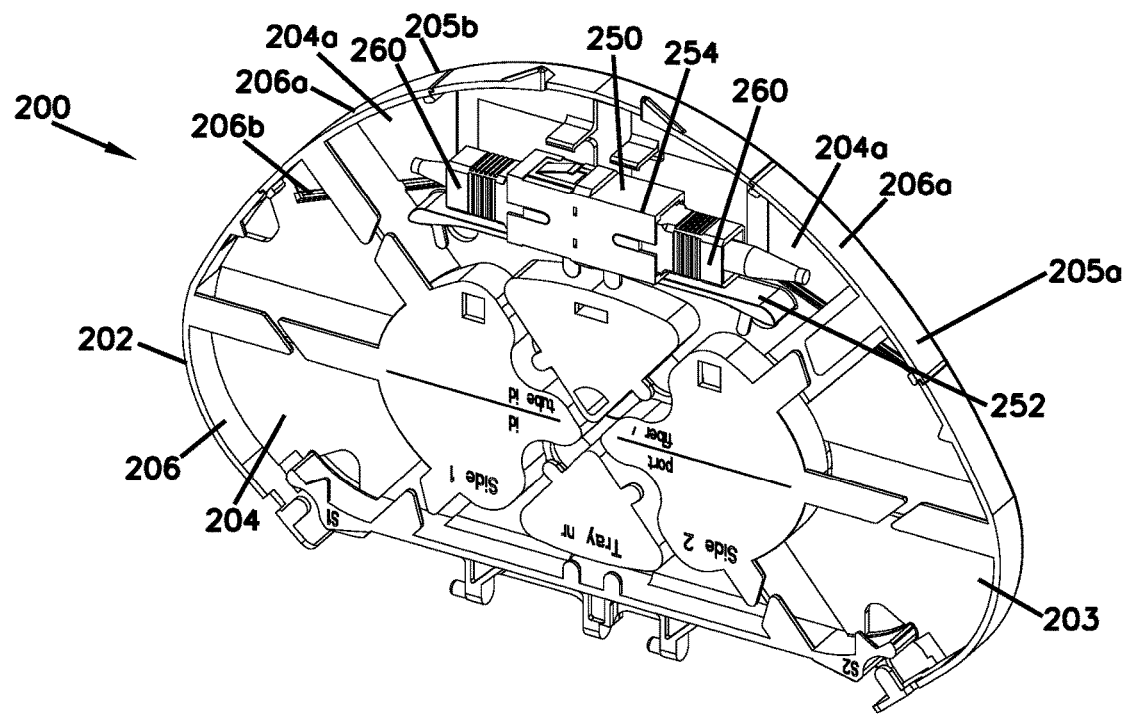
FIG. 8 is a front perspective view of a second example telecommunications optical fiber management tray in accordance with the principles of the present disclosure, wherein the tray includes SC-type couplers and is placed in a storage position.
Figure 9:
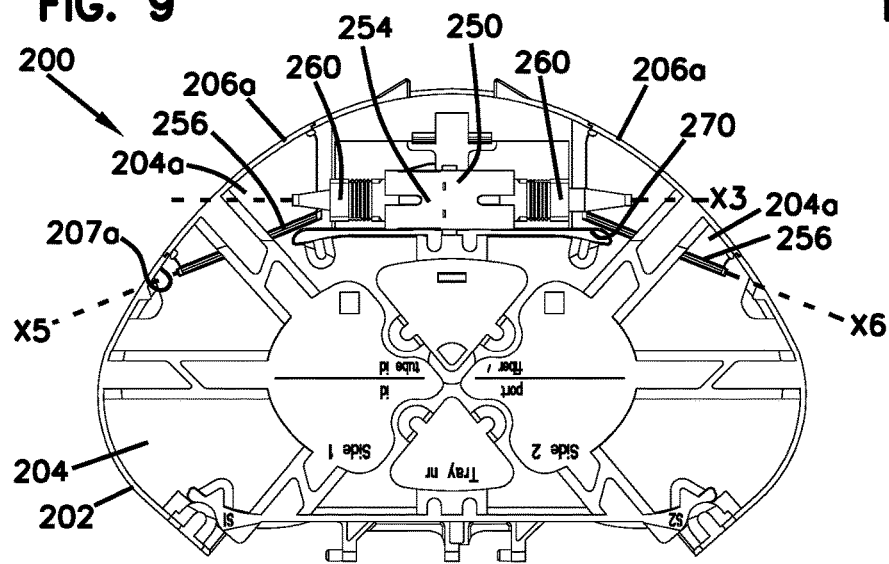
FIG. 9 is a front view of the example telecommunications optical fiber management tray shown in FIG. 8.
Figure 10:
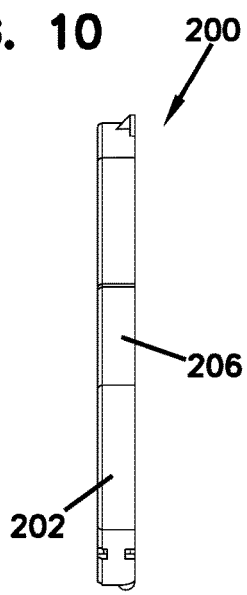
FIG. 10 is a side view of the example telecommunications optical fiber management tray shown in FIG. 8.
Figure 22:
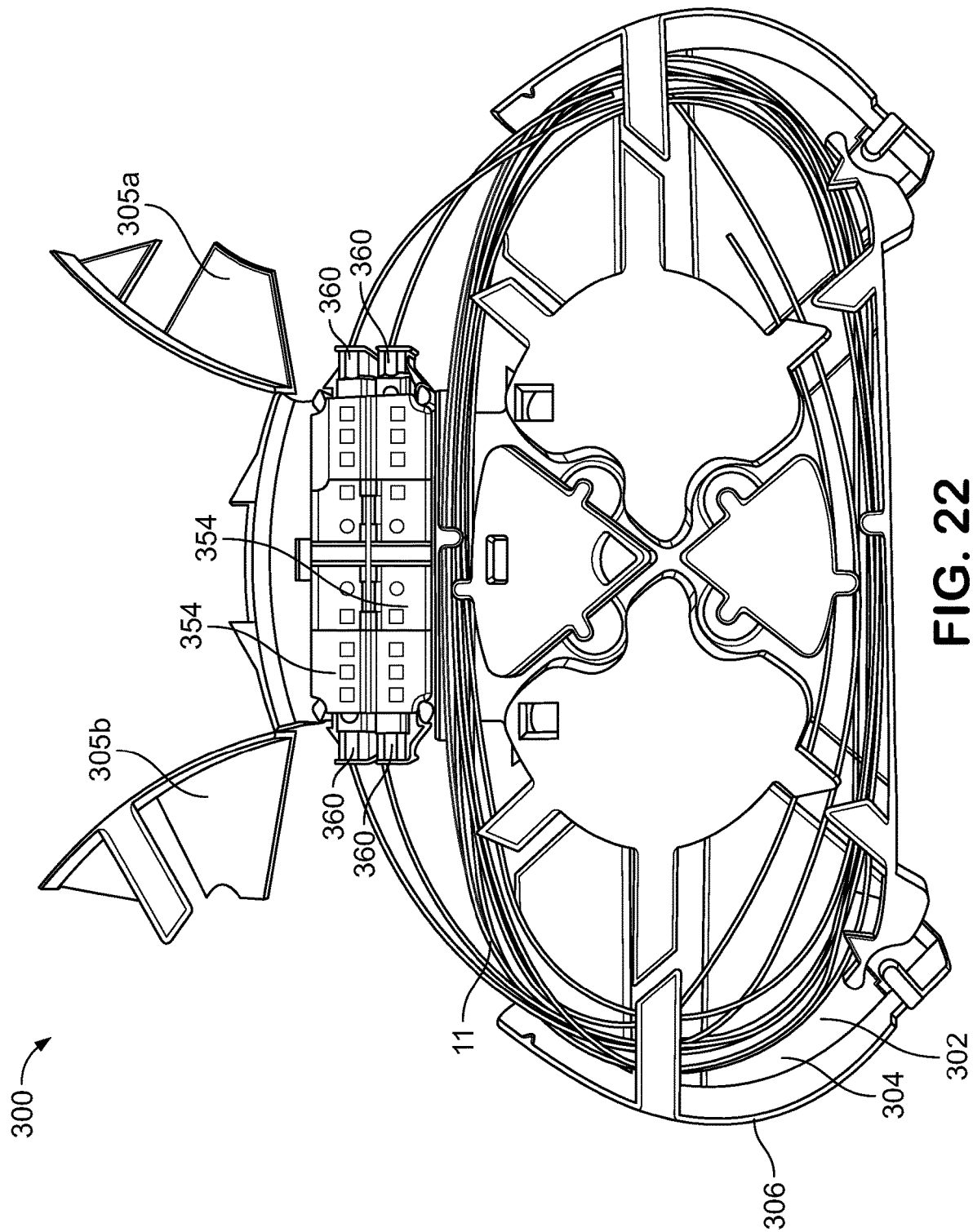
FIG. 22 is a front view of the example telecommunications optical fiber management tray shown in FIG. 16, wherein the tray is in the access position and a plurality of optical fibers are stored within the tray.
Figure 31:
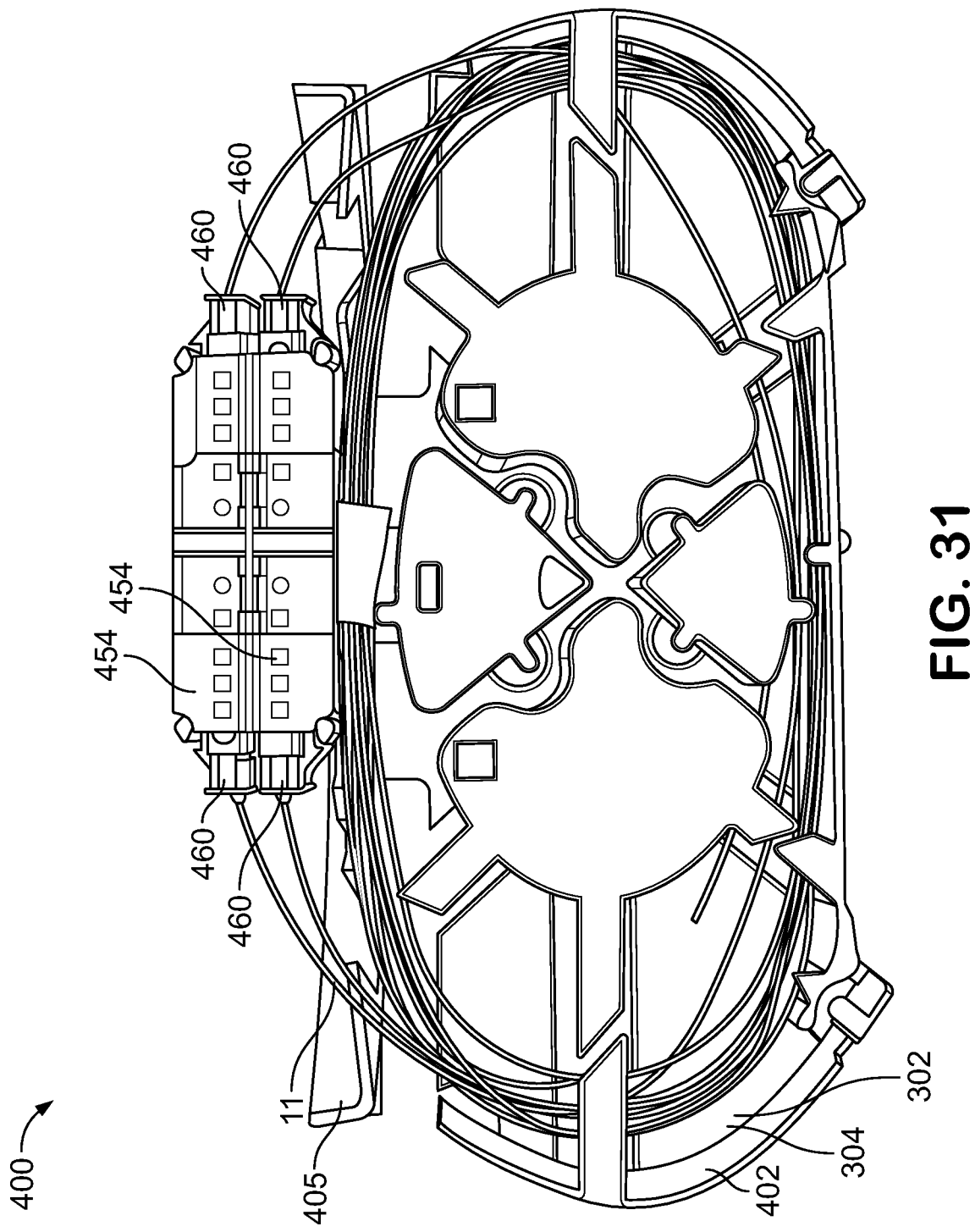
FIG. 31 is a front view of the example telecommunications optical fiber management tray shown in FIG. 25, wherein the tray is in the access position and a plurality of optical fibers are stored within the tray.

The present disclosure relates to advantageous example telecommunications optical fiber management trays adapted to be used within a telecommunications enclosure, closure, box, cabinet, terminal or at any other location where fiber management is desirable. The example telecommunications optical fiber management trays can include one or optical fiber connector or coupler assemblies. In one aspect, the optical fiber coupler or connector assemblies receive adapters. In some examples, the adapters are "dummy" or blank adapters associated with dark fibers 11 stored on the tray. Dark fibers are optical fiber cables that are installed within the system, but are not yet placed into service. In some examples, the blank adapter assemblies can include tags for identification of dark fiber, a lens providing protection from and an indication of active fiber for preparation, and alignment features. Each of the optical fiber management trays disclosed herein additionally includes access features for enabling enhanced installation and removal of the adapters into and out of connector or coupler assemblies. In use, an installer can pull out a dummy blank adapter from the connector or coupler assembly from the front side of the tray, and then bring the adapter to a light plug tool to add a light plug connector or coupler on the dark fiber without interference from other dark or active fibers. The connector or coupler assemblies and adapters may be provided in a variety of standard formats. For example, simplex or duplex LC, SC, MPO/MTP, MT-RJ formats may be used without departing from the concepts presented herein. A ferrule-less type connector may also be used, such as the type shown in U.S. Pat. No. 9,575,263, the entirety of which is hereby incorporated by reference in its entirety. FIGS. 7, 22, and 31 show the use of a connector of this general type.

FIGS. 1-7 illustrate a first example telecommunications optical fiber management tray 100. It should be noted that the tray 100 can be splice-only trays, splitter trays, combinations thereof, or house equipment having other functions. The tray 100 includes a main body 102 that has a base 104, and a fiber containment wall 106. In the example depicted, the fiber containment wall 106 extends upwardly from a front side 108 of the base 104 to define portions of a periphery 110 of the main body 102 of the tray 100 that surrounds the base 104. The base 104 and fiber containment wall 106 also together define a storage region 103 extending from the distal end of the fiber containment wall 106 to the base 104. In other examples, there may be more than one fiber containment wall 106 positioned on the main body 102 of the tray 100. In the example shown, the fiber containment wall 106 is curved, although alternatives are possible. In one example, the fiber containment wall 106 can function as fiber guides and have curvatures compatible with minimum bend radius requirements of the fibers intended to be managed on the tray 100.

The base 104 also defines a storage region 112 for storing slack or loops of optical fiber thereon. Various structures can be provided in the storage region 112 including splices and/or storage of cables, which will be described below. Various additional structures can be provided for managing and organizing the fiber optic cables, including a divider wall and cable retention tabs.

The base 104 of the main body 102 is shown as including a generally flat body of a suitably rigid or resilient plastic or polymeric material, although alternatives are possible. According to some examples, the tray 100 may be formed of a polymeric material, such as, polypropylene, polyethylene, nylon, ABS, PMMA, some other material or any combination thereof. In other examples, the tray 100 may be formed of any suitable rigid or semi-rigid material.

The main body 102 of the tray 100 may define an opening 114 (e.g., cut-out, notch) in the base 104. The opening 114 can be defined by a first end 116 of the base 104 and a second end 118 of the base 104, although alternatives are possible.

The example tray 10 can further include a sidewall 120. The sidewall 120 is positioned along the opening 114 of the base 104 to define a side of the opening 114, although alternatives are possible. As depicted, the sidewall 120 extends upwardly from a portion of the base 104 along the opening 114 defined by the first and second ends 114, 116 of the base 14.

The sidewall 120 is arranged and configured with a mechanical coupling interface 122 (e.g., a hinge mechanism, pivot mounts) to couple the tray 100 to a structure (e.g., a tray mounting plate, a fiber optic terminal, a fiber optic splice terminal, or other type of housing/enclosure). The mechanical coupling interface 122 may also be a snap-fit, an interference fit, and/or a press-fit.

The mechanical coupling interface 122 is arranged and configured on an outer surface 120a of the sidewall 120 facing toward the opening 114 of the base 104, although alternatives are possible. The mechanical coupling interface 122 includes hinge members 124 that are attached to the sidewall 120 to pivotally connect the tray 100 to the structure. The mechanical coupling interface 122 allows the tray 100 to rotate or pivot upwardly or downwardly at an angle with respect to a plane of the structure.

Although two hinge members 38 are shown, any number of hinges may be used. Additionally or alternatively, any mechanism or design that provides or allows for a pivoting or tilting action of the tray 100 with respect to the structure may be employed. Such mechanism or design may include for example a hinge that is constructed of the same or different material as the structure and/or tray 100. The hinge members 124 may be made of a lightweight, structurally flexible material, such as a polymeric material or molded plastic, although alternatives are possible. Additionally, the mechanical coupling interface 122 may be formed as an integral portion of one or both of the structure and/or tray 100. In other examples, the tray 100 may be secured to the structure by clamps, latches, straps or any other suitable mechanism, such as, capture arms.

The hinge members 124 can include snap-in pivot devices 126 (e.g., pivot pins, pivot rods). The snap-in pivot devices 126 can be configured to engage, for example, clips positioned on the structure. The clips can be configured to hold the snap-in pivot devices 126. The snap-in pivot devices 126 can pivot within the clips of the structure to allow the tray 100 to swing out individually for accessing optical fiber on the tray 100. In other examples, the snap-in pivot devices 126 and clips may be reversed such that the snap-in pivot devices 126 are configured on the structure and the clips are configured on the mechanical coupling interface 122. An example system suitable for use with trays 100 and showing hinged trays in a stacked arrangement can be found in US patent application publication serial number 2014/0321825, the entirety of which is hereby incorporated by reference.

The hinge members 124 can have a hinge axis X1 that is perpendicular to a tray axis X2. The tray 100 is adapted to pivot around the hinge axis 50. In certain examples, lower ones of the trays 100 in a stack can be accessed without removal of superposed trays. One end of the stack can be lifted upwardly or pivoted. After work within that tray 100 is completed, the tray 100 can be returned to its located position in the stack merely by reversing the procedure.

The tray 100 may include, for example, fiber guides, a splice/termination holder, and may include one or more pivoting components. The tray 10 can include fiber routing paths for routing excess fiber in looped configurations that prevent the fibers from being bent beyond their minimum bend radius requirements. Additionally, the splice tray 100 can retain and protect additional fiber optic components such as passive optical splitters and/or wavelength division multiplexors.

In certain examples, fiber management trays in accordance with the principles of the present disclosure can include structures for mounting optical fiber splices and/or additional passive optical components on major sides of the trays. In other examples, outputs of optical components can be routed to the tray for splicing to cables. Outputs of the optical component can also be spliced to optical fibers for forward feeding and/or back feeding signals through the main fiber optic cable.

The top surface 108 of the base 104 of the tray 10 is configured for storing, protecting, and routing optical fiber. For example, the top surface 108 can include structure that defines one or more fiber routing paths. In certain examples, the fiber routing paths can define one or more fiber loops. In certain examples, the fiber routing paths can include a fiber management loop that is routed along the periphery 110 of the main body 102 of tray 100.

Turning again to FIGS. 1 and 2, the tray 100 further includes a radius limiter structure 136 formed from a plurality of spaced apart lobes 128. Taken together, the lobes 128 ensure a minimum bend radius of fibers stored on the tray 100. The radius limiter structure 136 (e.g., fiber routing guide) is positioned on the top surface 108 of the base 104 in the storage region 112 for storing optical fiber. The radius limiter structure 136 projects upwardly from the top surface 108 of the base 104 and cooperate to define a protected main fiber management path 134 (e.g., a fiber management loop) at the top surface 108 of the base 104. The radius limiter structure 136 is constructed to limit the bend radius of cables when the cables are wrapped about the limiters for storage and/or organizational purposes. The radius limiter structure 136 can also assist and retain optical fibers in a looped configuration. The spaces between the lobes 128 allow for additional cable routing pathways 128a.

The main fiber management path 134 is defined between the lobes 128 and the fiber containment wall 106. To retain the optical fibers within the cable routing pathway 134, a first plurality of cable management elements 130 (fingers, tines, etc.) extend from the lobes over the cable routing pathway 134 in a direction towards the fiber containment wall. Additionally, a second plurality of cable management elements 132 extend from the fiber containment wall 106 over the cable routing pathway 134 in a direction towards the lobes 128. The elements 130, 132 extend towards each other, but leave a gap or space 134 between such that cables can be inserted or removed from the main cable routing pathway 134.

In the example depicted, one radius limiter structure 136 is shown on the base 104. Although one radius limiter structure 136 is shown, no fiber routing guides, one fiber routing guides, or any number of fiber routing guides may be used. In one example, the radius limiter structure 136 may be monolithically formed with the base 104 to define a one-piece unit. In certain examples, at least one inner fiber guide wall (not shown) may be used as a fiber routing guide on the tray 100. The inner fiber guide wall can project upwardly from the top surface 108 of the base 104, although multiple inner fiber guide walls may be used. FIG. 7 shows the tray 100 with optical fiber cables 11 routed within the cable routing pathway 134.

Figure 1:
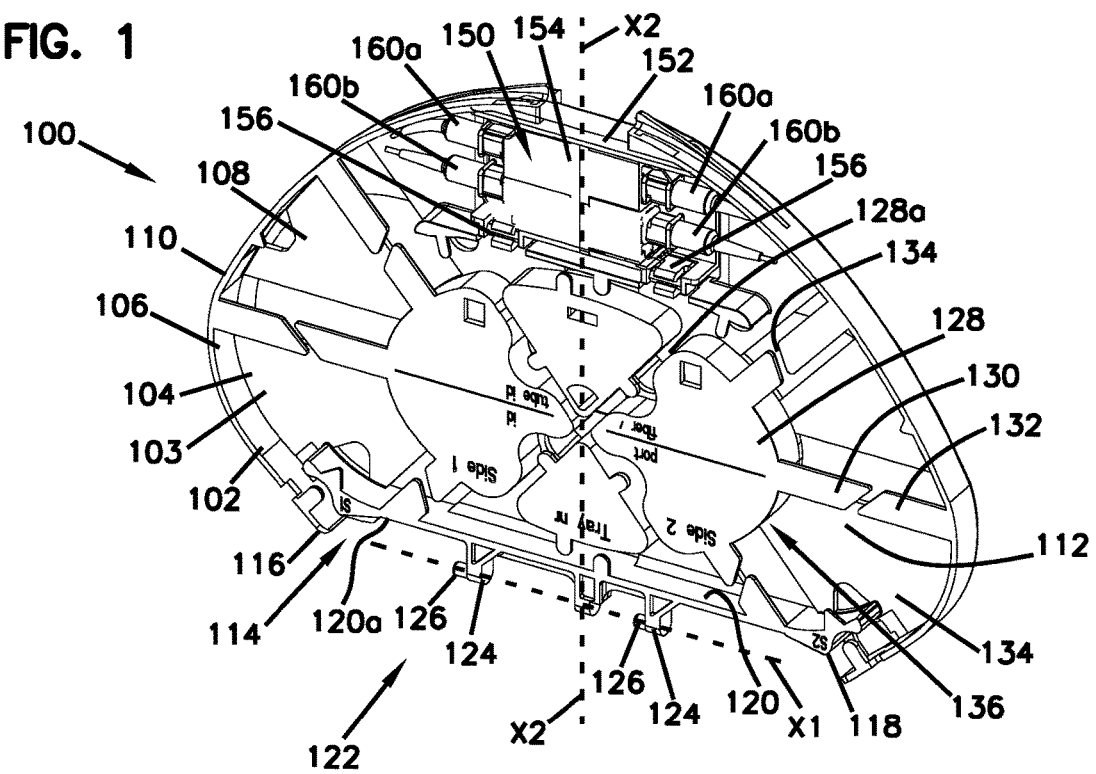
FIG. 1 is a front perspective view of a first example telecommunications optical fiber management tray in accordance with the principles of the present disclosure, wherein the tray includes LC-type connectors or couplers and is placed in a storage position.
Figure 2:
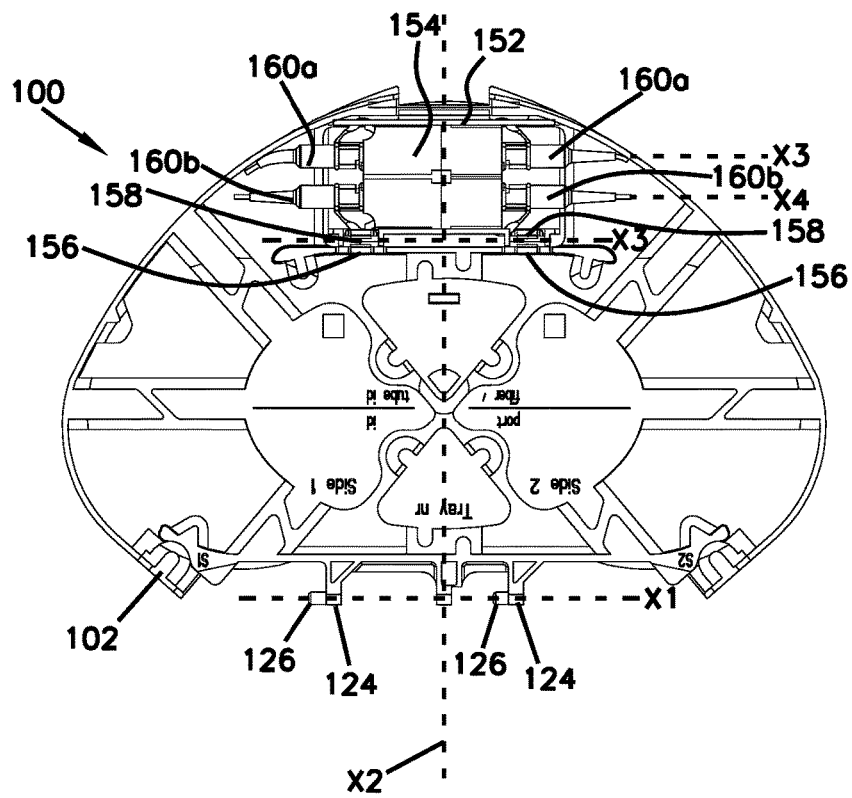
FIG. 2 is a front view of the example telecommunications optical fiber management tray shown in FIG. 1.

Still referring to FIGS. 1-2, the tray 100 is additionally shown as having a connector assembly 150 mounted within the storage region 103 of the tray. In one aspect, the connector assembly 150 includes a pivoting frame 152 and a connector or coupler 154 secured within the pivoting frame 152. As shown, the pivoting frame 152 includes a pair of hinge members 156 that engage with a corresponding pair of hinge members 158 on the tray 100. In the example shown in the drawings, the hinge members 156 are female hinge members and the hinge members 158 are male hinge members. However, hinge members 156 may be male and hinge members 158 may be female. Instead of hinge members, the pivoting frame 152 may be connected to the tray via a living hinge. In the example shown at FIGS. 1-7, the connector or coupler 154 is configured to couple two pairs (i.e. duplex) of LC-type fiber optic adapters 160. The couplers 154 may be configured to receive other types of adapters, for example simplex or duplex SC, MPO/MTP, MT-RJ adapters. Although two couplers 154 are shown as being retained by the pivoting frame 152, the pivoting frame 152 can be configured to hold fewer or more adapters. In one aspect, the first pair of adapters 160a and the corresponding ports of the coupler 154 are aligned a first longitudinal axis X3 while the second pair of adapters 160b and the corresponding ports of the coupler 154 are aligned along a second longitudinal axis X4.

Figure 3:
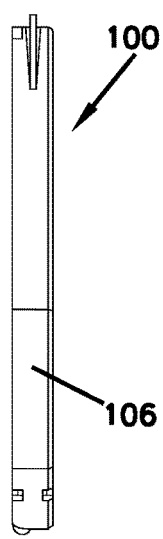
FIG. 3 is a side view of the example telecommunications optical fiber management tray shown in FIG. 1.

As can be seen at FIGS. 1-3, the pivoting frame 152 is rotated into a storage position about a pivot axis X3 in which the couplers 154 and adapters 160 are stored in the tray 100 and within the space defined by the fiber containment wall 106. As can be seen at FIG. 3 in particular, the couplers 154 and adapters 160 do not extend beyond the height of the fiber containment wall 106. While the couplers 154 and adapters 160 are satisfactorily stored in the tray 100 when the pivoting frame 152 is in the stored position, the adapters 160 cannot be easily removed from or installed into the couplers 154 due to the proximity of the fiber containment wall 106 to the adapters 160.

In order to enhance access to the couplers 154, the pivoting frame 152 can be rotated to an access position about the hinge members 156, 158, as shown at FIGS. 4-6. In this position, it can be readily seen that the couplers 154 and adapters 160 now have line-of-site access in which the fiber containment wall 106 is not aligned with the couplers 154 and adapters 160. In the example shown, the adapters 160 can now be easily removed from or inserted into the couplers 154 since the pivoting frame 152 rotates the couplers 154 outside of the boundary defined by the fiber containment wall 106. In one aspect, the pivoting frame 152 is rotated to a position that is orthogonal to the base 104 when the pivoting frame 152 is rotated to the access position. Additional features can be provided for retaining the pivoting frame 152 in the storage position and for providing a positive stop when the pivoting frame 152 is rotated into the access position. For example, the pivoting frame 150 can be provided with a deflectable member 162 having protrusions or tabs 164 that can be selectively engaged with a recess or other structure 166 of the tray 100 for holding the pivoting tray 152 in the storage position. The tray can be released from the storage position by depressing the deflectable member 162 until the tabs 164 are disengaged from the structure 166 of the tray 100. The deflectable member 162 is configured such that the pivoting frame 152 can be rotated into the storage position with the deflectable member automatically deflecting around and into the structure 166 without requiring a user to directly depress the deflectable member 162.

Referring to FIGS. 8-15, a second example tray 200 is shown. The tray 200 shares many features in common with the tray 100, and such similarities need not be repeated here as the previous description for these features is fully applicable for tray 200. Accordingly, the foregoing description will be limited to the differences between tray 200 and tray 100. Primarily, tray 200 differs from tray 100 in the manner in which the tray 200 storage and access positions are achieved. Rather than having a pivotable frame structure, the connector 250 for tray 200 is held in a static, mounted position by a frame structure 252 that is integrally formed with the base 204 of the main body 202. To provide access such that the adapters 160 can be removed and installed from the ports of the connector 254, a pair of identical, but mirrored hinged access doors 205 (205a, 205b) are provided in the main body 202. As shown, the hinged access door 205a is formed from a portion 204a of the base 204 and a portion 206a of the fiber containment wall 206 and hinges about a living hinge 207a aligned along an axis X5 that is at an oblique angle to the axis X3 of the ports of the connector 254. Similarly, the hinged access door 205b is formed from a portion 204b of the base 204 and a portion 206b of the fiber containment wall 206 and hinges about a living hinge 207*b* along an axis X6 that is at an oblique angle to the axis X3 of the ports of the connector 250 and to the axis X5. In one example, the hinges 207*a*, 207*b* of the doors 205*a*, 205*b* are oriented such that axes X3, X5, and X6 are all parallel to each other. In one aspect, the access doors 205*a*, 205*b* also include cable management elements 232 of the tray 300.

Figure 11:
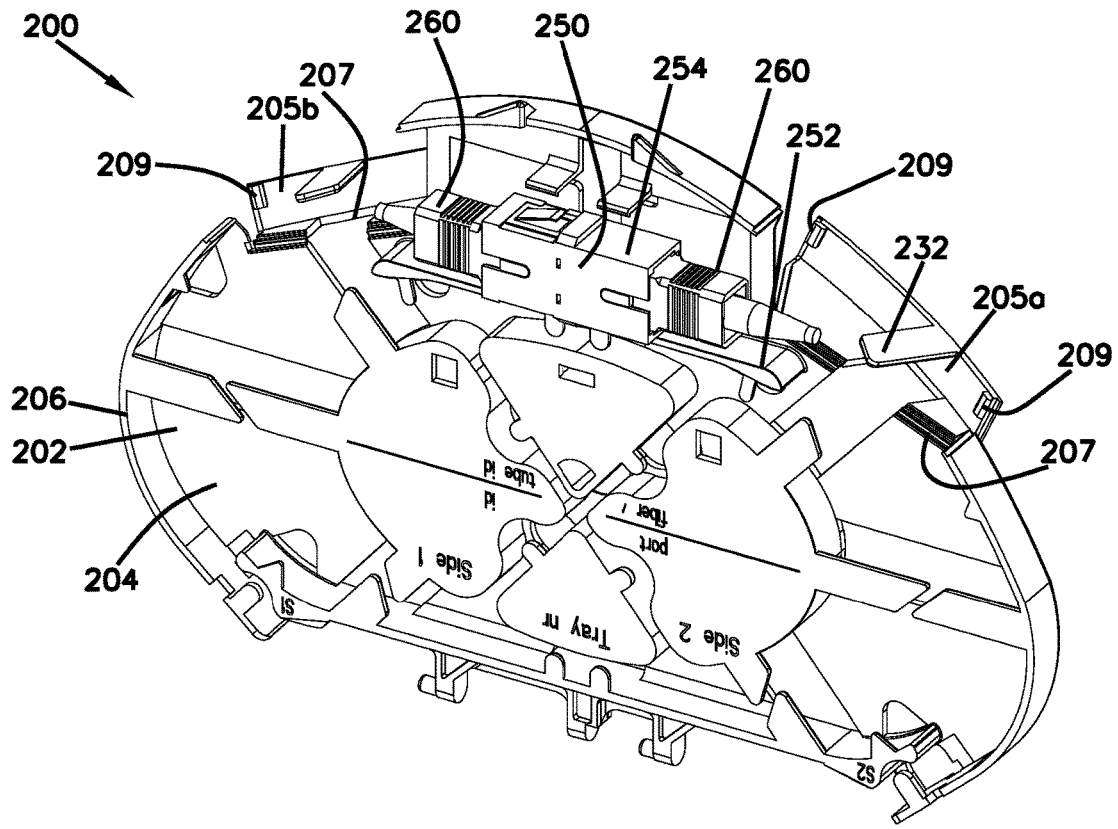
FIG. 11 is a front perspective view of the example telecommunications optical fiber management tray shown in FIG. 8, wherein the tray is placed in an access position.
Figure 12:
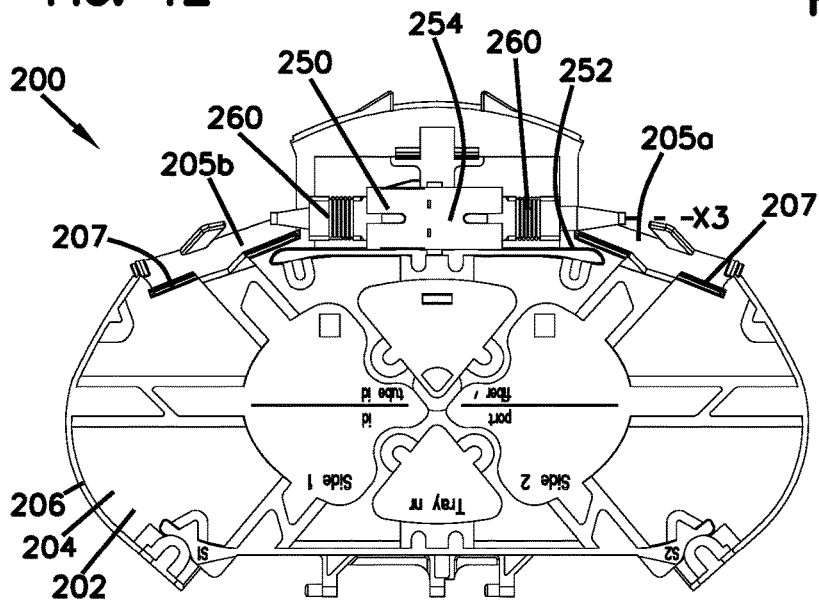
FIG. 12 is a front view of the example telecommunications optical fiber management tray shown in FIG. 11.
Figure 13:
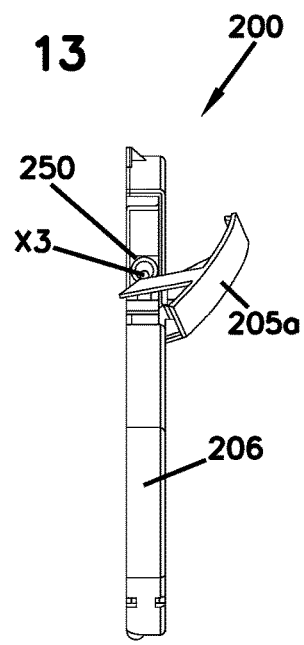
FIG. 13 is a side view of the example telecommunications optical fiber management tray shown in FIG. 11.

As can be seen at FIGS. 11-13, the doors 205*a*, 205*b* have been moved to the access position about the hinges 207*a*, 207*b*. As most easily seen at FIG. 13, the doors 205*a*, 205*b* have been rotated sufficiently such that the fiber containment wall portions 206*a*, 206*b* no longer block the axis X3 of the connector ports and such that a line-of-site exists between the connector ports and a location beyond the fiber containment wall 206.

Figure 14:
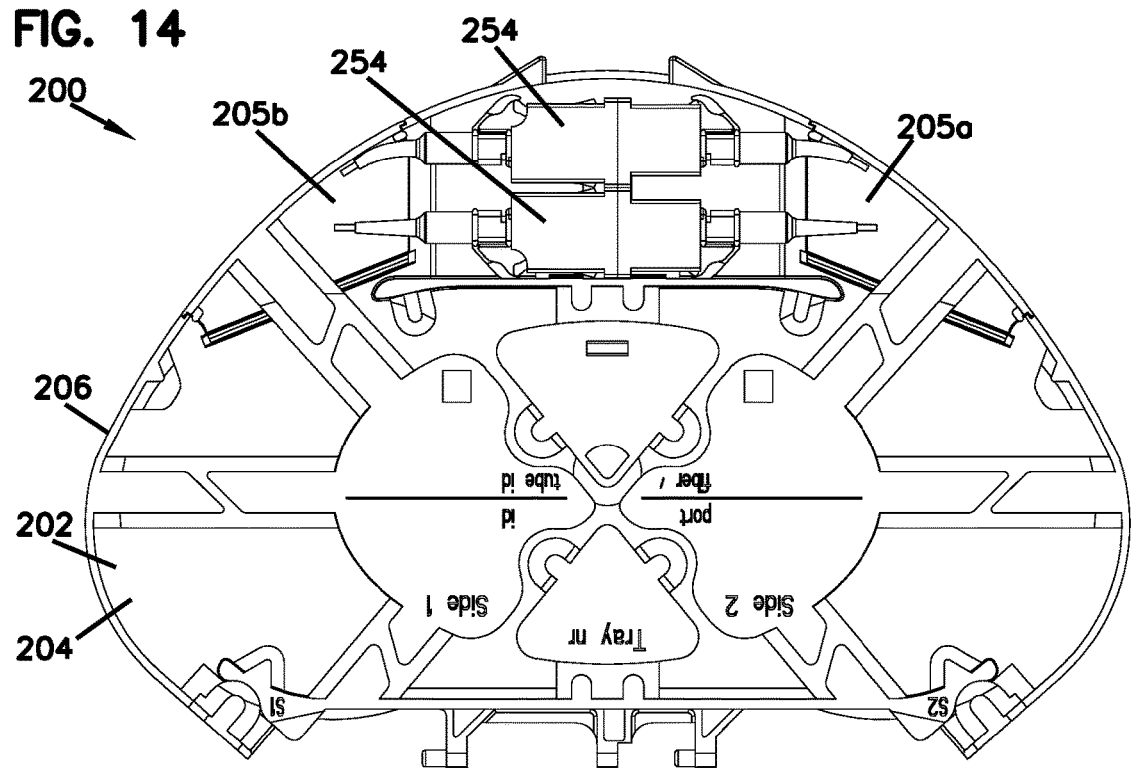
FIG. 14 is a front view of the example telecommunications optical fiber management tray shown in FIG. 8 in the storage position, with LC-type couplers installed instead of SC-type couplers.
Figure 15:
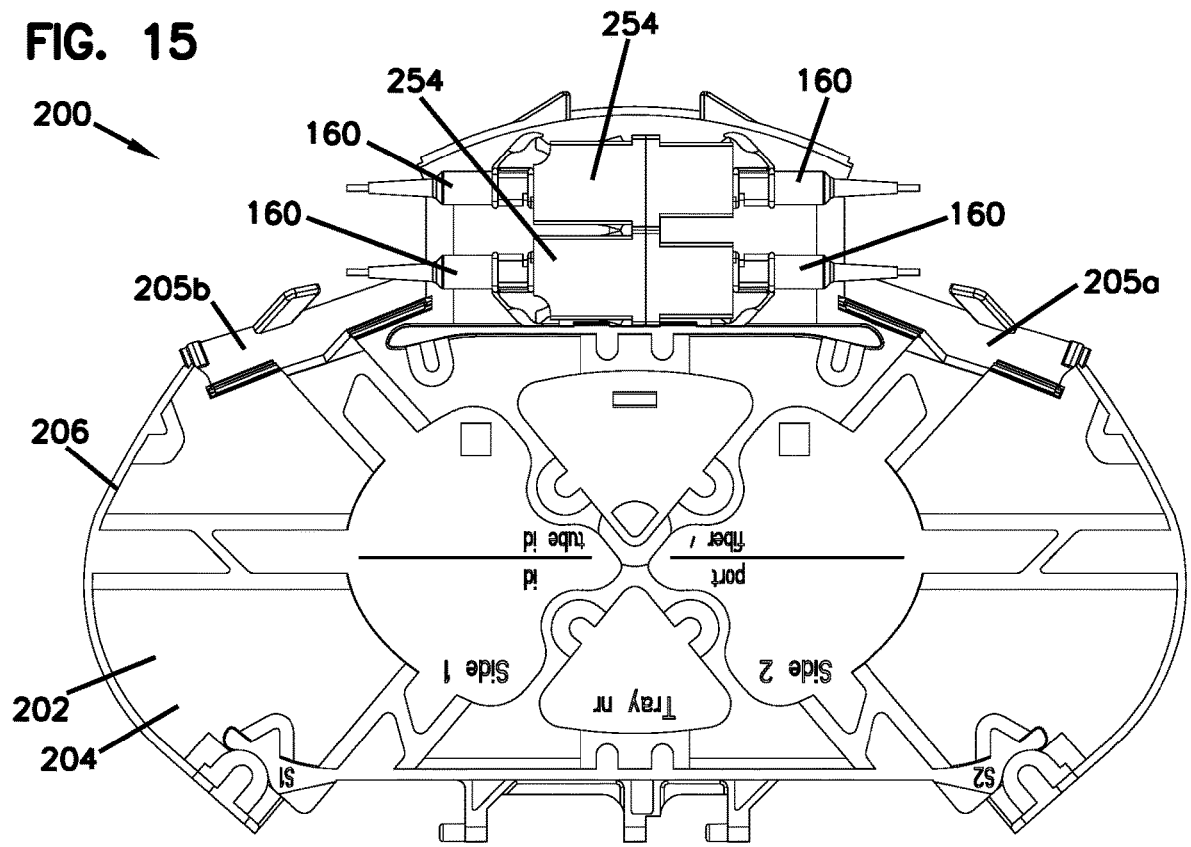
FIG. 15 is a front view of the example telecommunications optical fiber management tray shown in FIG. 14 in the access position.
Figure 16:
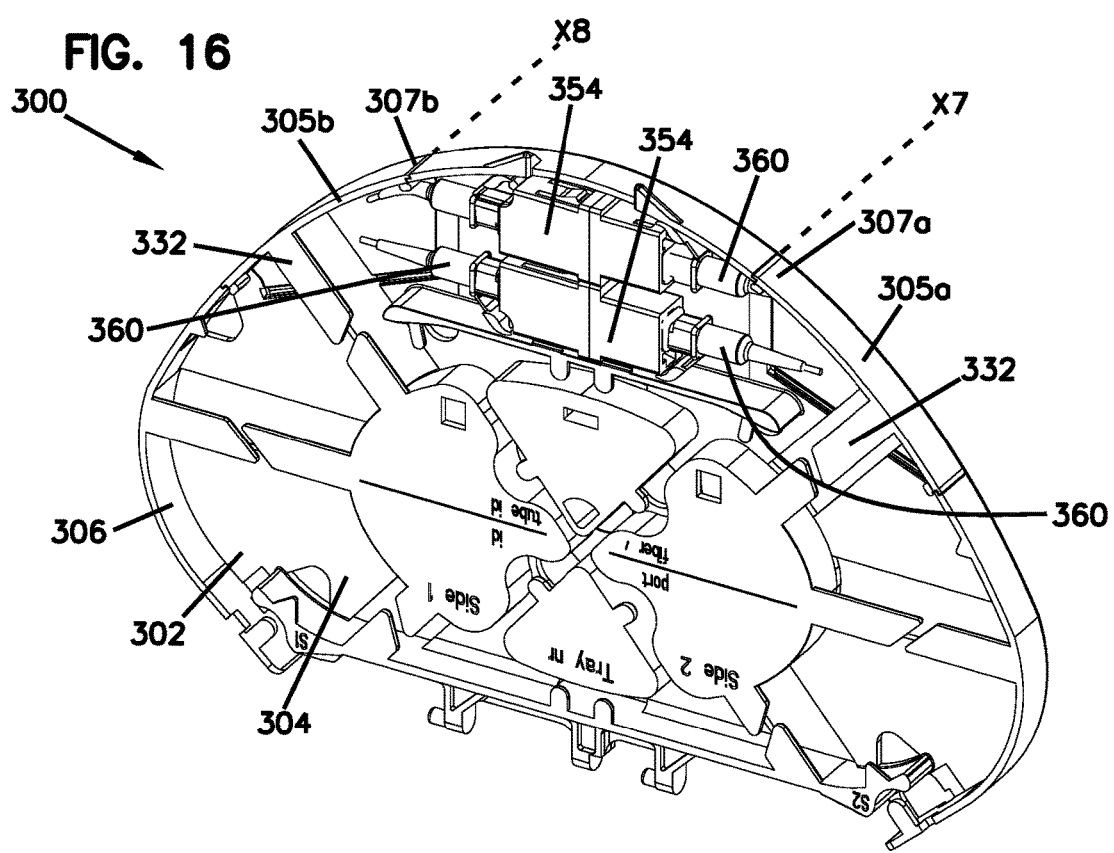
FIG. 16 is a front perspective view of a third example telecommunications optical fiber management tray in accordance with the principles of the present disclosure, wherein the tray includes LC-type couplers and is placed in a storage position.
Figure 17:
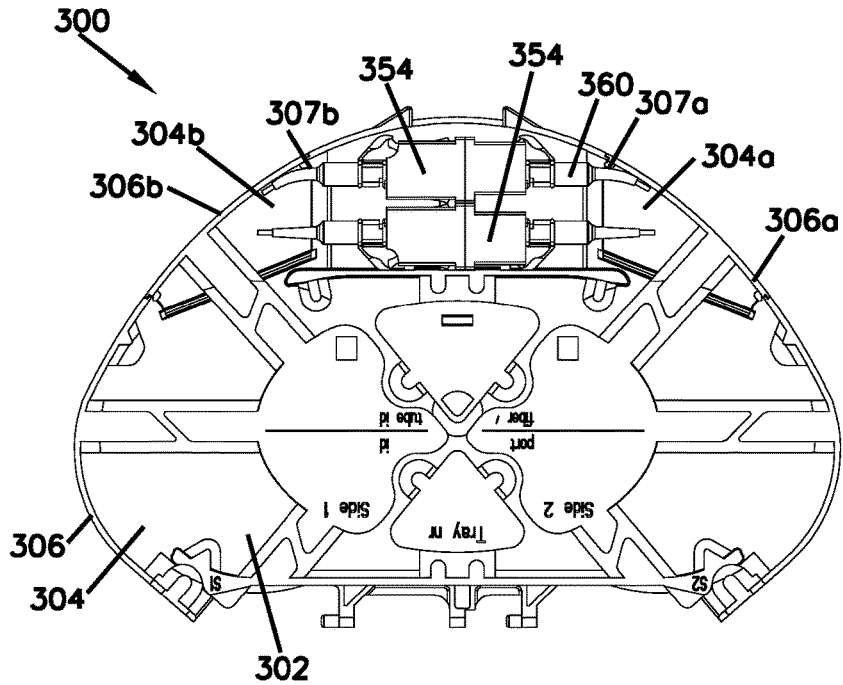
FIG. 17 is a front view of the example telecommunications optical fiber management tray shown in FIG. 16.
Figure 18:
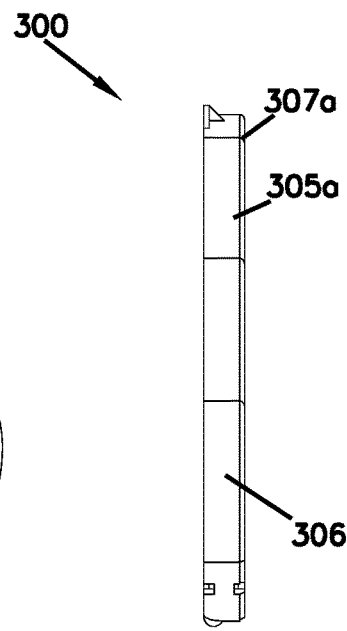
FIG. 18 is a side view of the example telecommunications optical fiber management tray shown in FIG. 16.
Figure 19:
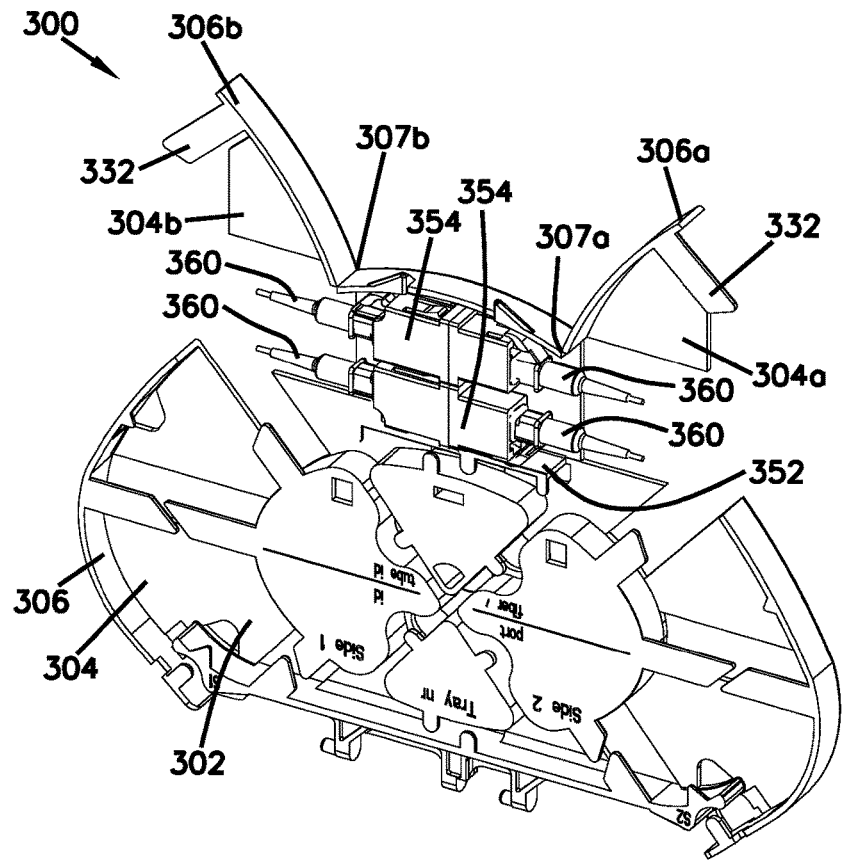
FIG. 19 is a front perspective view of the example telecommunications optical fiber management tray shown in FIG. 8, wherein the tray is placed in an access position.
Figure 20:
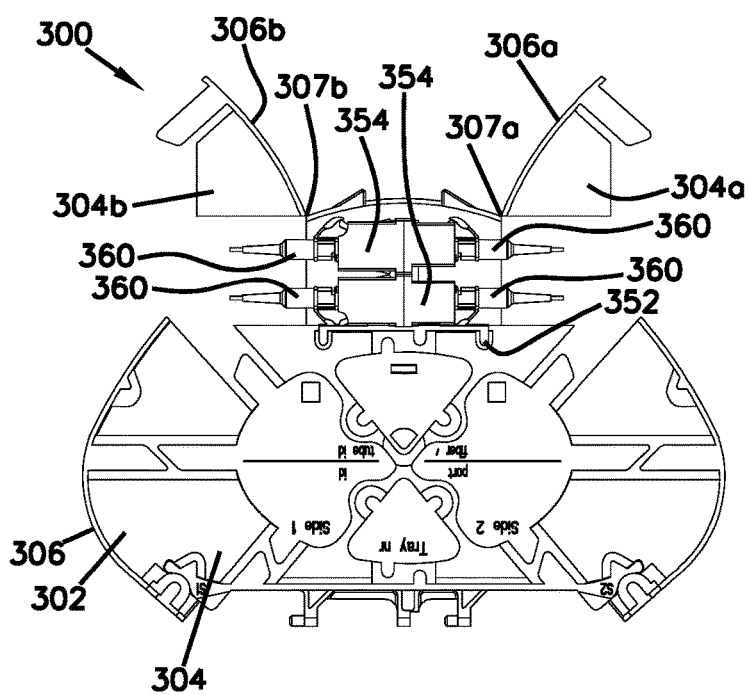
FIG. 20 is a front view of the example telecommunications optical fiber management tray shown in FIG. 19.
Figure 21:
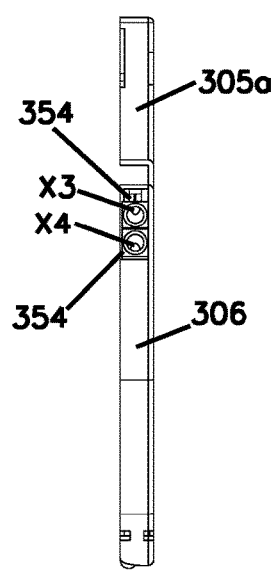
FIG. 21 is a side view of the example telecommunications optical fiber management tray shown in FIG. 19.

As with tray 100, tray 200 can be provided with features that enable the doors 205*a*, 205*b* to latch into the storage position, for example tabs 209. In the example shown at FIGS. 8-13, the connector or coupler 254 is configured to couple a pair (i.e. simplex) of SC-type fiber optic adapters 360. The coupler 254 may be configured to receive other types of adapters, for example simplex or duplex LC, MPO/MTP, MT-RJ adapters. Such an example is shown at FIGS. 14 and 15, wherein a pair of LC-type couplers 254 are provided on tray 200.

Referring to FIGS. 16-24, a third example tray 300 is shown. The tray 300 shares many features in common with the trays 100 and 200, and such similarities need not be repeated here, as the previous description for these features is fully applicable for tray 300. Accordingly, the foregoing description will be limited to the differences between tray 300 and trays 100, 200. Primarily, tray 300 differs from trays 100, 200 in the manner in which the tray 200 storage and access positions are achieved.

Rather than having a pivotable frame structure of the type shown for tray 100 or the access doors with a hinge in the base 204, tray 300 has access doors 305*a*, 305*b* that have a living hinge 307*a*, 307*b* in the fiber containment wall 306. As such, the access doors 305*a*, 305*b* pivot about axes X7 and X8 that are orthogonal to the longitudinal axes X3, X4 of the ports of the connectors 354. As shown, the hinged access door 305*a* is formed from a portion 304*a* of the base 304 and a portion 306*a* of the fiber containment wall 306 while the hinged access door 305*b* is formed from a portion 304*b* of the base 304 and a portion 306*b* of the fiber containment wall 306. As can be most easily seen at FIGS. 19-22, the access doors 305*a*, 305*b* swing upwardly such that the axes X3, X4 do not pass through any portion of the fiber containment wall 306 when the doors 305*a*, 305*b* are in the access position.

Figure 23:
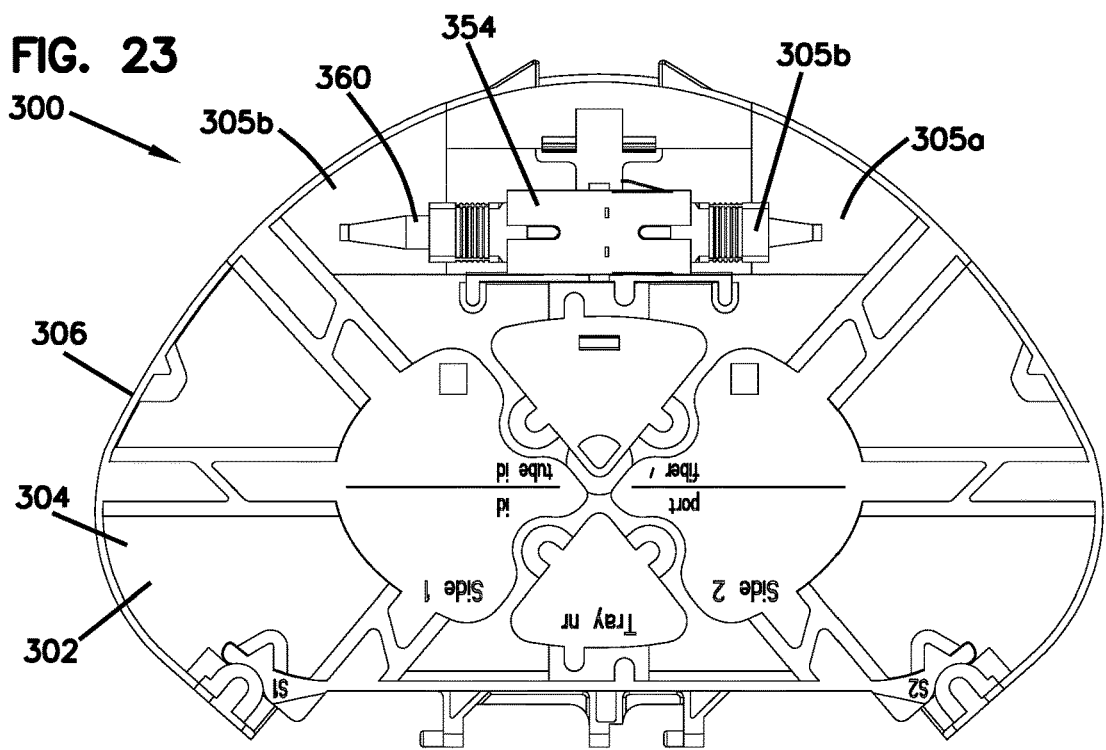
FIG. 23 is a front view of the example telecommunications optical fiber management tray shown in FIG. 16 in the storage position, with SC-type couplers installed instead of LC-type couplers.
Figure 24:
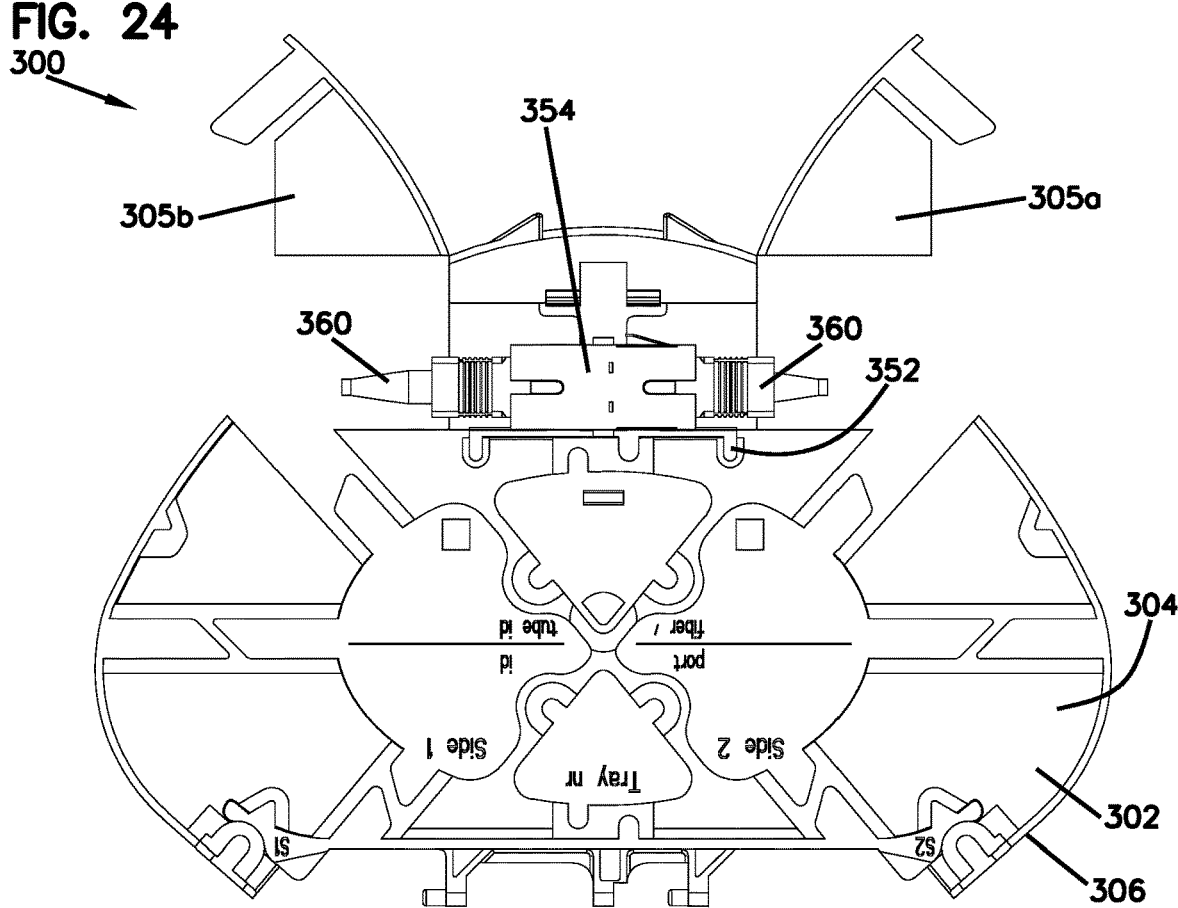
FIG. 24 is a front view of the example telecommunications optical fiber management tray shown in FIG. 23 in the access position.
Figure 25:
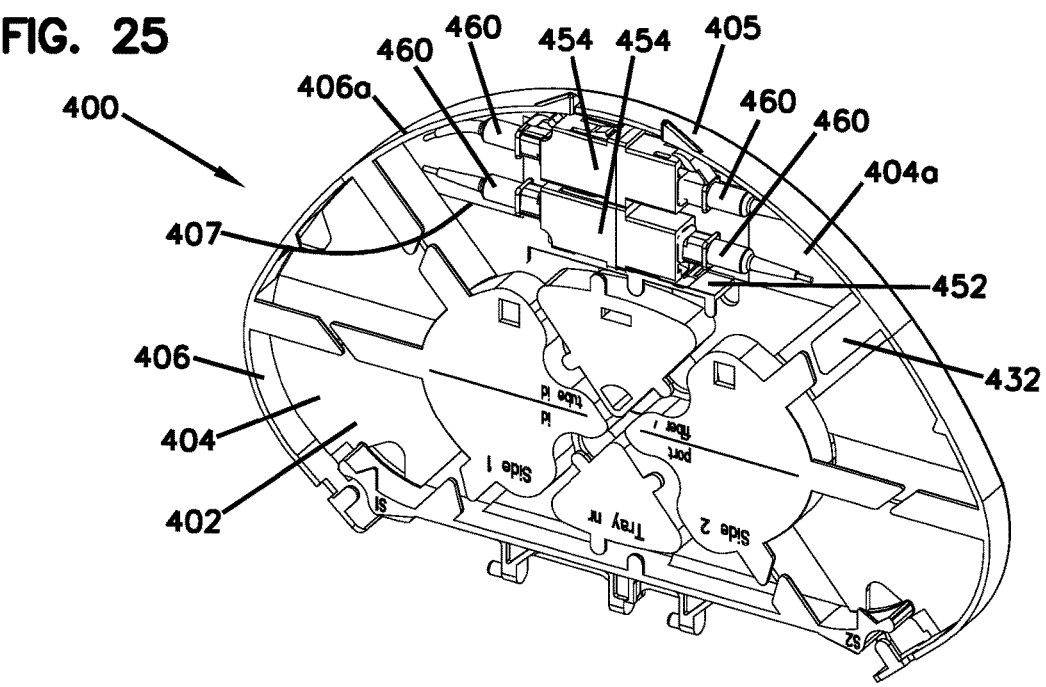
FIG. 25 is a front perspective view of a fourth example telecommunications optical fiber management tray in accordance with the principles of the present disclosure, wherein the tray includes LC-type couplers and is placed in a storage position.
Figure 26:
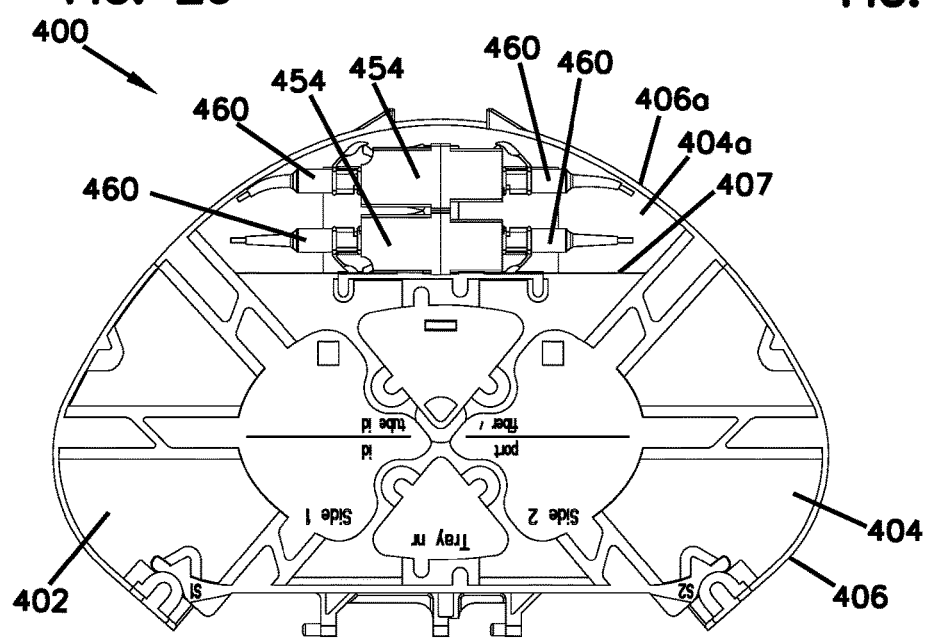
FIG. 26 is a front view of the example telecommunications optical fiber management tray shown in FIG. 25.
Figure 27:
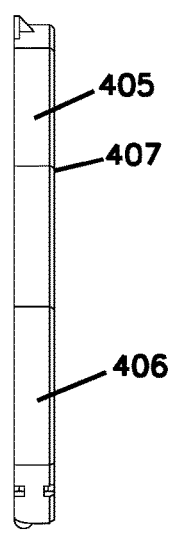
FIG. 27 is a side view of the example telecommunications optical fiber management tray shown in FIG. 25.
Figure 28:
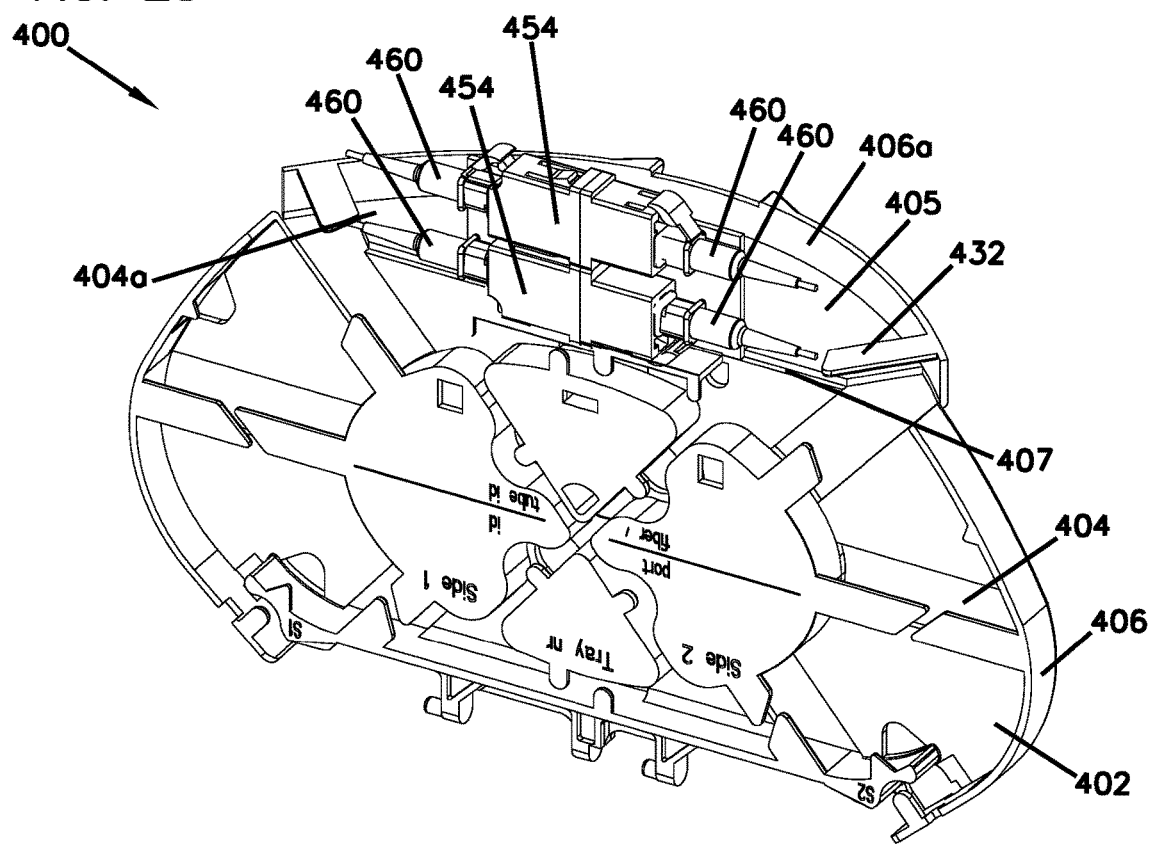
FIG. 28 is a front perspective view of the example telecommunications optical fiber management tray shown in FIG. 23, wherein the tray is placed in an access position.
Figure 29:
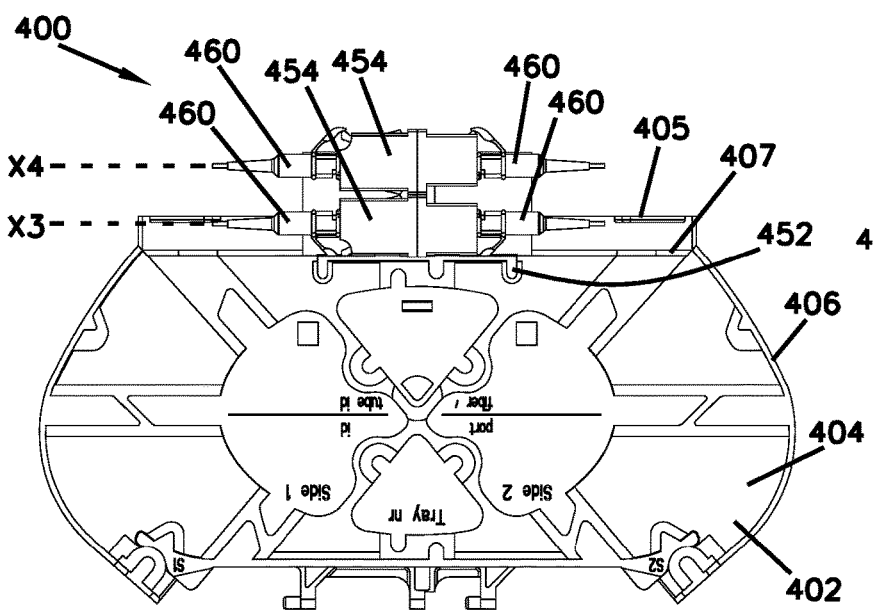
FIG. 29 is a front view of the example telecommunications optical fiber management tray shown in FIG. 28.
Figure 30:
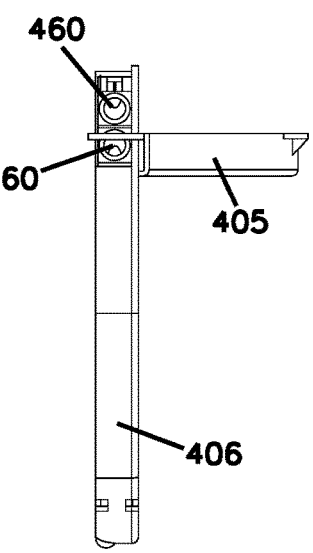
FIG. 30 is a side view of the example telecommunications optical fiber management tray shown in FIG. 28.

As with tray 200, tray 300 can be provided with features that enable the doors 305*a*, 305*b* to latch into the storage position. In the example shown at FIGS. 16-22, the connector or coupler 354 is configured to couple two pairs (i.e. duplex) of LC-type fiber optic adapters 360. The coupler 354 may be configured to receive other types of adapters, for example simplex or duplex SC, MPO/MTP, MT-RJ adapters. Such an example is shown at FIGS. 23 and 24, wherein a single SC-type coupler 354 is provided on tray 300.

Referring to FIGS. 25-33, a fourth example tray 400 is shown. The tray 400 shares many features in common with the trays 100, 200, and 300, and such similarities need not be repeated here, as the previous description for these features is fully applicable for tray 400. Accordingly, the foregoing description will be limited to the differences between tray 400 and trays 100, 200, 300. Primarily, tray 400 differs from trays 100, 200, 300 in the manner in which the tray 400 storage and access positions are achieved.

Rather than having a pivotable frame structure of the type shown for tray 100 or the multiple access doors of the trays 200 and 300, tray 400 has a single access door 405. The access door 405 of tray 400 is provided with a living hinge extending along the base 404 that extends along an axis X9 that is parallel to the axes X3, X4 of the ports in the connectors 454. As shown, the hinged access door 405 is formed from a portion 404*a* of the base 404 and a portion 406*a* of the fiber containment wall. As can be most easily seen at FIGS. 28-30, the access door 405 swings downwardly such that the axes X3, X4 do not pass through any portion of the fiber containment wall 406 when the door 305*a* is in the access position. As with access doors of trays 200 and 300, the door 405 of tray 400 also includes cable management elements 432.

Figure 32:
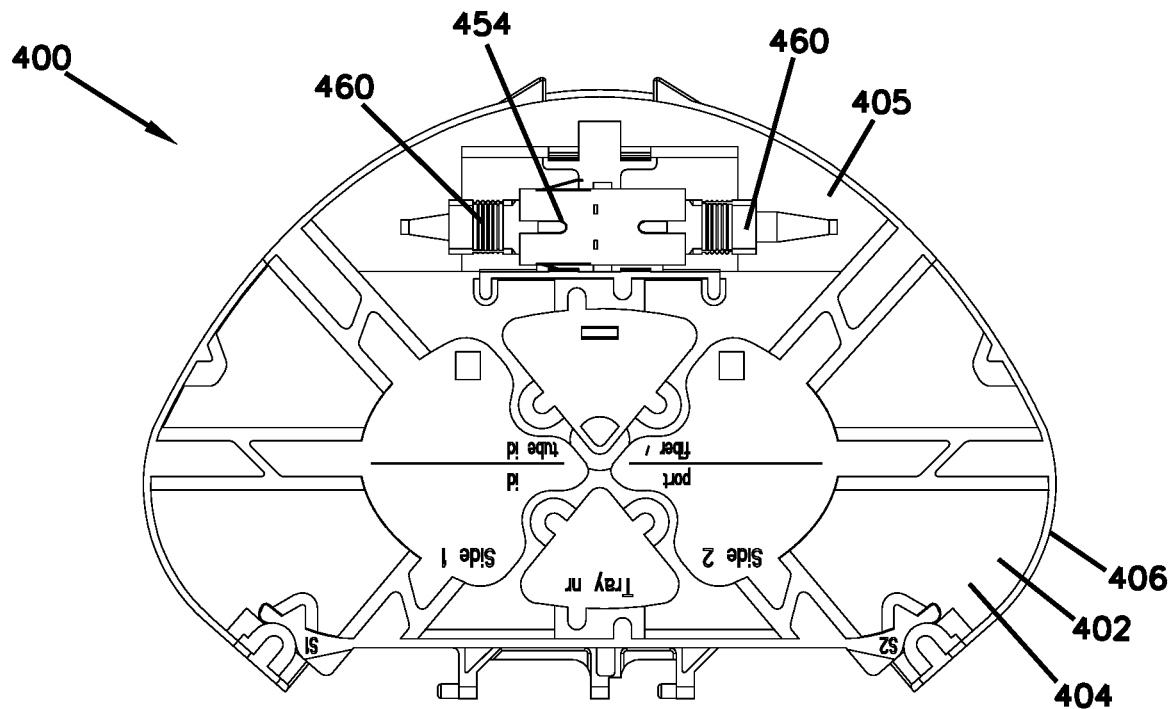
FIG. 32 is a front view of the example telecommunications optical fiber management tray shown in FIG. 25 in the storage position, with SC-type couplers installed instead of LC-type couplers.
Figure 33:
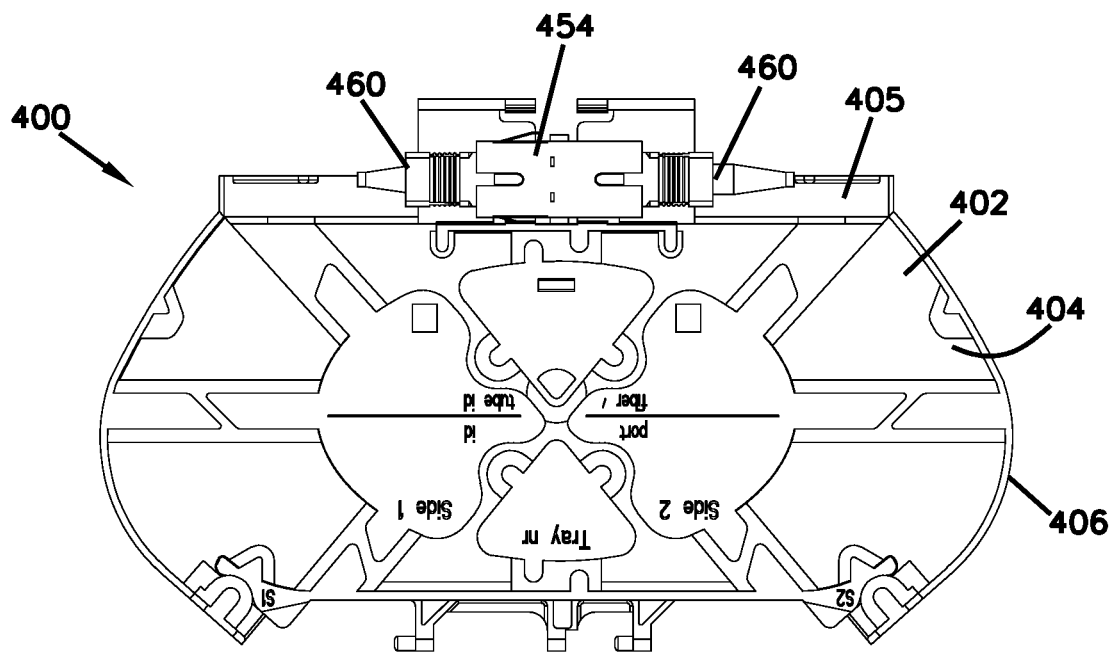
FIG. 33 is a front view of the example telecommunications optical fiber management tray shown in FIG. 32 in the access position.

As with trays 200, 300, tray 400 can be provided with features that enable the doors 305*a*, 305*b* to latch into the storage position. In the example shown at FIGS. 25-31, the connector or coupler 454 is configured to couple two pairs (i.e. duplex) of LC-type fiber optic adapters 460. The coupler 454 may be configured to receive other types of adapters, for example simplex or duplex SC, MPO/MTP, MT-RJ adapters. Such an example is shown at FIGS. 32 and 33, wherein a single SC-type coupler 454 is provided on tray 400.

From the forgoing detailed description, it will be evident that modifications and variations can be made without departing from the spirit and scope of the disclosure.

What is claimed is:

1. A fiber optic telecommunications tray, comprising:
    a. a main body including a base and a fiber containment wall extending upwardly from the main body, the fiber containment wall defining portions of a perimeter of the main body of the tray that surrounds the base, the fiber containment wall and base defining a storage region extending from the base to a distal end of the fiber containment wall; and
    b. a frame structure holding one or more fiber optic connectors, the frame structure being mounted to or formed integrally with the main body, the one or more fiber optic connectors each having a port for receiving a fiber optic adapter, the port being aligned along a longitudinal axis;
    c. the tray being configurable from a storage position to an access position, wherein:
        i. in the storage position, the one or more fiber optic connectors and the fiber containment wall are positioned such that the connector port longitudinal axis passes through the fiber containment wall; and
        ii. in the access position, a first portion of the main body is rotated with respect to a second portion of the main body about a living hinge such that the connector port longitudinal axis does not pass through the fiber containment wall.

2. The fiber optic telecommunications tray of claim 1, wherein the frame structure is rotatable about a pivot axis from a first position corresponding with the storage position to a second position corresponding to the tray access position.

3. The fiber optic telecommunications tray of claim 1, wherein the main body includes a hinge member for pivotally mounting the tray to a structure.

4. The fiber optic telecommunications tray of claim 1, wherein the tray includes fiber management features defining a cable routing pathway.

5. The fiber optic telecommunications tray of claim 1, wherein a first portion of the main body includes a first portion of the fiber containment wall and a second portion of the main body includes a second portion of the fiber containment wall.

6. The fiber optic telecommunications tray of claim 1, wherein a first portion of the main body includes a first portion of the base and a second portion of the main body includes a second portion of the base.

7. The fiber optic telecommunications tray of claim 5, wherein the living hinge is defined as a portion of the fiber containment wall.

8. The fiber optic telecommunications tray of claim 6, wherein the living hinge is defined as a portion of the base.

9. A fiber optic telecommunications tray, comprising:
   a. a main body including a base and a fiber containment wall extending upwardly from the main body, the fiber containment wall defining portions of a perimeter of the main body of the tray that surrounds the base, the fiber containment wall and base defining a storage region extending from the base to a distal end of the fiber containment wall, wherein the main body includes a hinge member for pivotally mounting the tray to a structure;
   b. a frame structure holding one or more fiber optic connectors, the frame structure being pivotally mounted to the main body, the one or more fiber optic connectors each having a port for receiving a fiber optic adapter, the port being aligned along a longitudinal axis;
   c. the tray being configurable from a storage position to an access position, wherein:
      i. in the storage position, the frame structure is rotated with respect to the base such that the connector port longitudinal axis passes through the fiber containment wall;
      ii. in the access position, the frame structure is rotated with respect to the base such that the connector port longitudinal axis does not pass through the fiber containment wall.

10. The fiber optic telecommunications tray of claim 9, wherein the tray includes fiber management features defining a cable routing pathway.

11. A fiber optic telecommunications tray, comprising:
   a. a main body including a base and a fiber containment wall extending upwardly from the main body, the fiber containment wall defining portions of a perimeter of the main body of the tray that surrounds the base, the fiber containment wall and base defining a storage region extending from the base to a distal end of the fiber containment wall; and
   b. a frame structure holding one or more fiber optic connectors, the frame structure being mounted to or formed integrally with the main body, the one or more fiber optic connectors each having a port for receiving a fiber optic adapter, the port being aligned along a longitudinal axis;
   c. the tray being configurable from a storage position to an access position, wherein:
      i. in the storage position, a first portion of the main body, including a portion of one or both of the base and the fiber containment wall, is positioned with respect to a second portion of the main body, including another portion of one or both of the base and the fiber containment wall, such that the connector port longitudinal axis passes through the fiber containment wall; and
      ii. in the access position, the first portion of the main body is rotated with respect to the second portion of the main body about a hinge portion such that the connector port longitudinal axis does not pass through the fiber containment wall.

12. The fiber optic telecommunications tray of claim 11, wherein the main body includes a hinge member for pivotally mounting the tray to a structure.

13. The fiber optic telecommunications tray of claim 11, wherein the tray includes fiber management features defining a cable routing pathway.

14. The fiber optic telecommunications tray of claim 11, wherein the first portion of the main body includes a first portion of the fiber containment wall and the second portion of the main body includes a second portion of the fiber containment wall.

15. The fiber optic telecommunications tray of claim 11, wherein the first portion of the main body includes a first portion of the base and the second portion of the main body includes a second portion of the base.

16. The fiber optic telecommunications tray of claim 14, wherein the first portion of the fiber containment wall can rotate relative to the second portion of the fiber containment wall about the hinge portion.

17. The fiber optic telecommunications tray of claim 15, wherein the first portion of the base can rotate relative to the second portion of the base about the hinge portion.

* * * * *